United States Patent [19]
Helbing et al.

[11] 3,855,764
[45] Dec. 24, 1974

[54] ASPARAGUS HARVESTING APPARATUS AND METHOD

[75] Inventors: Clarence R. Helbing; Russel Peters; Hugh E. Cooper, all of Rochelle, Ill.

[73] Assignee: Towner Manufacturing Company, Santa Ana, Calif.

[22] Filed: Nov. 14, 1973

[21] Appl. No.: 415,674

[52] U.S. Cl. .................................... 56/327 A, 56/1
[51] Int. Cl. ........................................... A01d 45/00
[58] Field of Search ..................... 56/327 A, 1, 327

[56] References Cited
UNITED STATES PATENTS

| | | | |
|---|---|---|---|
| 2,767,544 | 10/1956 | Turkington | 56/327 A |
| 3,328,943 | 7/1967 | Marmorine et al. | 56/327 A |
| 3,452,525 | 7/1969 | Francis | 56/327 A |

*Primary Examiner*—Russell R. Kinsey
*Attorney, Agent, or Firm*—Johnson, Dienner, Emrich & Wagner

[57] ABSTRACT

Asparagus is harvested by apparatus on which is mounted a conveyor apron and several reel-mounted snapping bars which are counter-rotated downwardly ahead of and across the conveyor apron to harvest the asparagus spears by snapping the spears between the bars and the lead edge of the apron as the apparatus more slowly moves forwardly over the bed of growing asparagus. Parallelogram linkages each having one link fixed to a respective bar and an opposite link fixed to the apparatus hold the reel-mounted snapping bars in a constant vertical disposition as each bar is lowered with rotation of the reel ahead of the next asparagus clump approached by the apparatus and moved across the stationary abutment to effectively snap the spears, the bars also serving to move the snapped spears across the apron to the collecting conveyor.

18 Claims, 4 Drawing Figures

ASPARAGUS HARVESTING APPARATUS AND METHOD

This invention relates to harvesting apparatus, and particularly to apparatus capable of harvesting asparagus by snapping the spears at a selected stubble height with minimal injury to the tender spears, and a process therefor.

Historically, asparagus has been picked by hand cutting or snapping. In recent years there has been an effort to develop a mechanical harvester which would selectively cut the mature spears as the apparatus was drawn or propelled across the field. Thought was that such a machine could obviate the necessity of the grower to rely on a large and temporary manual labor force at asparagus harvesting time, with the attendant problems, as well as expense thereof. However, to date, so far as applicant is aware, the thus far commercially introduced harvesters have required complicated structure to effect the cutting, were expensive to construct and in their operation have been found less than satisfactory.

U.S. Pat. No. 3,452,525 discloses an apparatus in which asparagus spears are proposed to be harvested by means of transverse planar slats fixed between a pair of endless chains which rotate with the forward motion of the apparatus. Each slat is moved downwardly and rearwardly at an angle and speed related to the forward progress of the apparatus such that the slats maintain a vertical disposition and a zero horizontal velocity relative to ground so as to support the asparagus stalks while the forward motion of the apparatus causes the approaching edge of the conveyor to pass beneath and snap off the stalks below the area support therefor provided by the slats. The thus severed asparagus stalks fall onto and are collected by the conveyor. Such apparatus, however, has certain inherent problems therein, some of which are discussed in the patent and include the critical spacing of the slats and synchronization of their movement to avoid severe mangling of the asparagus spears and other damage thereto.

A principal object of the present invention is to provide apparatus of simple and economical construction which will be effective to machine snap the asparagus to a uniform stubble height as the apparatus is moved across a field of growing asparagus.

In accordance with the invention, such apparatus comprises a motile frame or vehicle which may be drawn behind a tractor or self-propelled across a field of growing asparagus, the vehicle supporting a horizontal abutment which may be the leading edge of an arcuate apron onto which the harvested asparagus is deposited and fed to a conveyor or other collecting station. The abutment locates the height at which the asparagus is severed and is adjustable to effect the harvesting. The vehicle also supports a reel which rotates on a horizontal axis disposed above and in a vertical plane behind the abutment. Equi-spaced about the periphery of said reel are a plurality of horizontally disposed snapping bars which move downwardly with rotation of the reel ahead of the abutment to gather a clump of asparagus stalks and move them rapidly across the abutment of the approaching vehicle so as to effectively snap the spears therebetween and the abutment to a uniform stubble height.

A feature of the invention is that as the snapping bars revolve with the reel they are held in a constant vertical disposition by what effectively constitute four-bar linkages or parallelograms of which one link comprises a fixed extension of a respective snapping bar and defines two spaced pivot points of the parallelogram in the plane of the snapping bar, the other two pivot points being fixed to the vehicle and one of which is the horizontal axis on which the reel rotates.

A further important feature of the invention is that the asparagus is harvested in clumps determined by the related lengths of the links comprising the parallelogram and the peripheral speed of the lower edge of the snapping bars which is related to the forward ground speed of the apparatus.

A further feature of the invention is the arcuate shape of the path which the snapping bar follows in its approach to the abutment to accomplish a minimum flailing and damage to the spears in the harvesting of the asparagus spears.

A further important feature of the invention is the location of said abutment at a distance forwardly of the vertical plane which contains the axis on which the reel and snapping bars rotate, which minimizes collection of dirt and trash with the harvested asparagus spears. The forward positioning of the abutment also rotates the angular opening between the snapping bars to provide a maximum opening therebetween to receive the asparagus spears and sets up optimum conditions for the snapping process.

Still another feature of the invention is the inclination of the snapping bar lead surface at a small angle off vertical such that the top of the snapping bar contacts the top of the spear before the lower portion of the spear engages the abutment so as to lessen double breakage of the asparagus spears.

As afterwards herein more completely discussed, companion thereto is the control exercised over the downward path of the snapping bars as each in turn is lowered ahead of a clump of asparagus spears and carried rearwardly across the approaching abutment. This is determined in part by the disposition maintained for the snapping bars, the location of the abutment along the path of the bars, the relation observed between the rotational speed of the snapper bars and the slower ground speed of the vehicle, and provide for a clean harvesting of asparagus at a uniform stubble height with a minimum of flailing and injury to the asparagus spears.

Many other objects, advantages and features of the invention will be apparent or will become so upon consideration of the detailed description of a preferred embodiment of the invention which now will be described.

Figure 4:
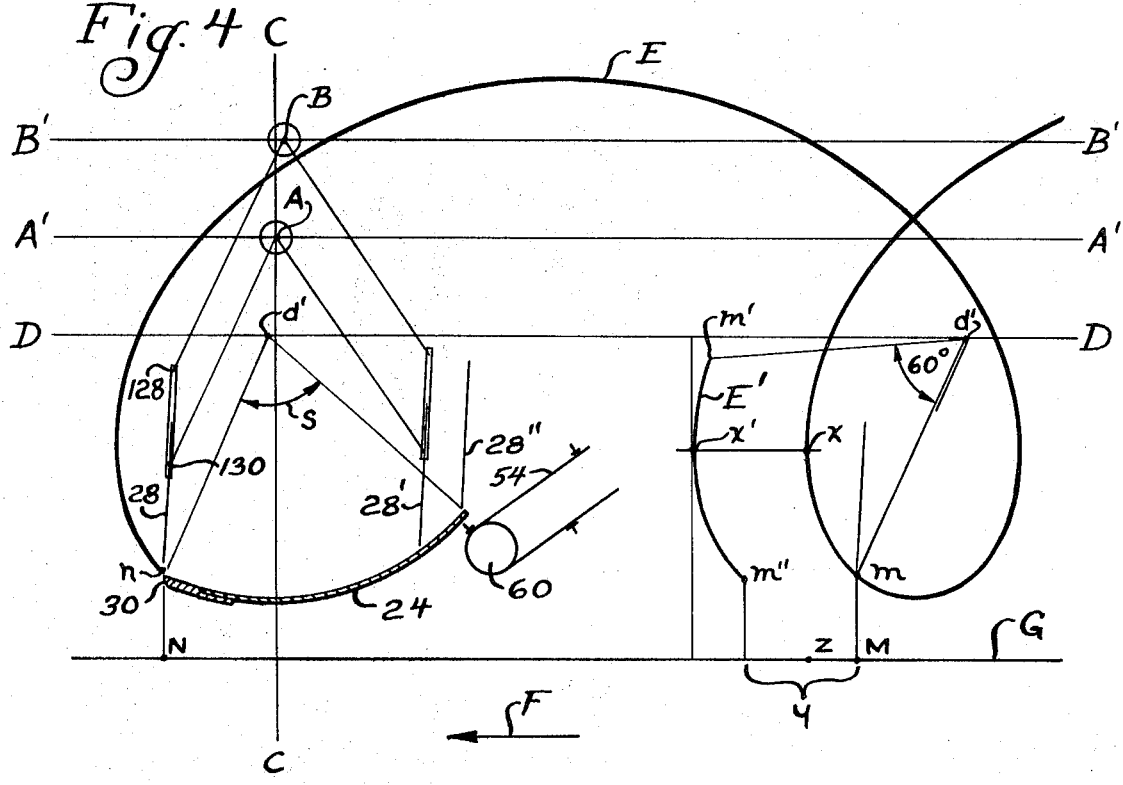
Figure 3:
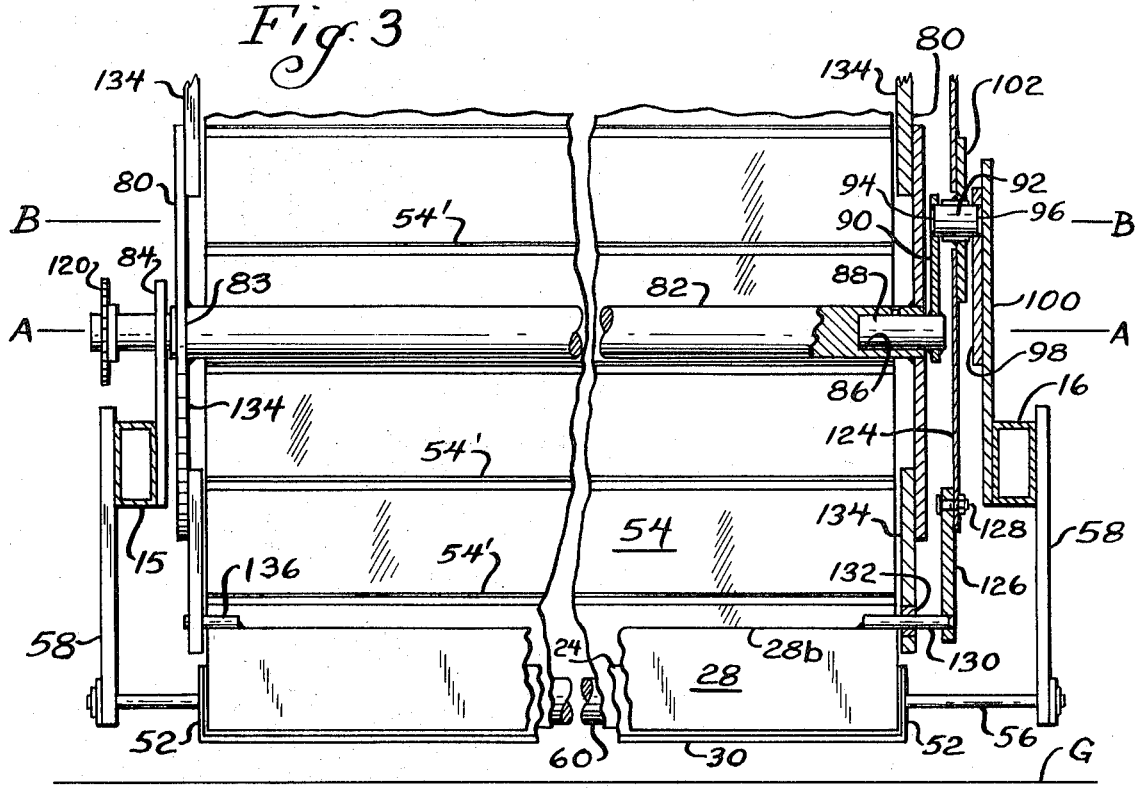

FIG. 3 is a front view of the reel assembly of snapping bars, the same being shown fragmented partly in section; and FIG. 4 is a schematic view illustrating the path of movement of the snapping bars as each approaches the leading edge of the conveyor apron and moves thereacross, said Figure also indicating the shape of the apron and the disposition of its leading edge or abutment to the path of the snapping bars as well as the vertical plane which contains the horizontal axis about which the snapping bars are directed with rotation of the reel.

Figure 1:
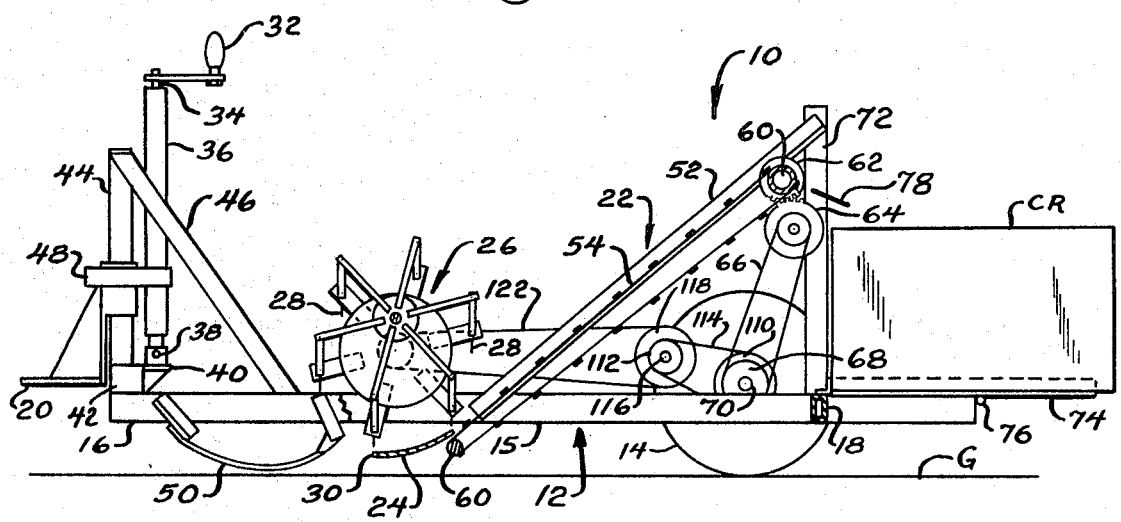
FIG. 1 is a side elevational view somewhat schematic and illustrating the invention embodied in an asparagus harvesting apparatus designed to be drawn by a tractor.

Referring now more specifically to the several views wherein like parts are identified by like reference numerals, FIG. 1, as aforementioned, illustrates the invention embodied in a harvesting machine or apparatus designated generally as 10. Said apparatus 10 comprises a generally rectangular-shaped frame 12 supported off ground surface G by wheels 14 which give motility to the apparatus. Frame 12 may be of any suitable open construction. In FIG. 1 it is illustrated as comprising a pair of laterally spaced longitudinal members or beams 15, 16 united by laterally extending spaced crosspieces, one of which is indicated in FIG. 1 at 18. Attached to the forward end of frame 12 as afterwards described more in detail is a hitch 20 by which the apparatus may be hitched in conventional manner behind a tractor so as to be drawn thereby across a field of growing asparagus to harvest the same.

Frame 12 provides support for a rearwardly located inclined conveyor indicated generally at 22 having a feed apron 24 supported adjacent its lower end beneath frame 12 and forwardly of its ground engaging wheels 14. Supported over apron 24 and above frame 12 is a reel 26 providing support at its periphery for a plurality of snapping bars 28 which with rotation of reel 26 move across leading edge 30 of apron 24 to effectively harvest asparagus spears of a bed or field over which the apparatus is drawn as afterwards described in detail.

Leading edge 30 of the apron constitutes a horizontally disposed abutment against which the asparagus spears engage as the snapping bars 28 move thereover. It is preferably narrow and blunted although it may be beveled as shown in the drawing. The height of leading edge 30 thus determines the stubble height, or height at which the asparagus spears are severed from the stubble; and means are provided whereby this height may be adjusted to suit the asparagus grower's requirements. This may be achieved by raising and lowering tractor hitch 20, thereby changing the height at which frame 12, and apron 24, is supported off the ground surface G by the tractor. A suitable adjustment device for this purpose is illustrated in FIG. 1 as comprising a handle 32 attached to one end of screw-threaded shaft 34. Screw shaft 34 threadedly cooperates with internal threads (not shown) in a housing 36 which has its lower end conventionally bolted as at 38 to an affixed member 40 mounted on a crosswise frame member 42, which is itself transversely connected between horizontal frame members 15, 16. A vertical guide post 44 extends upwardly from the cross frame member 42 and is slidable through and relative to hitch 20. Reinforcing bars 46 are positioned and connected between vertical post 44 and horizontal frame members 15, 16 to further brace the adjustment device. A crosspiece 48 slidably secures housing 36 to hitch 20. Thus, selective rotation of handle 32 effectuates in a known manner corresponding vertical movement of housing 36 and which in turn effects vertical movement of the vertical post 44 and frame 12 relative to the hitch 20 and ground surface G. Arcuate skids 50 located and attached at the forward end of the longitudinal frame members 15, 16 support the lower end of the conveyor 22 and apron 24 from damaging contact with the ground when the harvester 10 is disconnected from the tractor.

In the illustrated embodiment of the invention apron 24 is provided with opposed integral side walls 52 which extend beyond the apron proper and are inclined upwardly along either side of conveyor belt 54, the upper ends of said sidewalls 52 being welded or otherwise fastened to upright frame members 72. At 56 is a transverse bar or rod secured between depending members 58 which are welded or otherwise secured to longitudinal members 15, 16 of the apparatus frame 12. As illustrated in FIG. 3, transverse rod 56 provides rotatable support for roller 60 about which the lower end of the conveyer belt 54 extends and thereby also supports apron 24. Usefully, apron 24 is thus supported at a height such that it is below longitudinal frame members 15, 16 and so that with frame 12 hitched level, its leading edge 30 will be about 3 inches above ground level. This is considered a desirable height at which to harvest asparagus, because usually the tougher and less desirable portions of the stalks are at or below this level. Also, there is less damage to the new growth. Conveyor belt 54 is preferably of the endless slat type and provided with the usual transverse ribs or projections 54'. At the upper end of its course, belt 54 extends about a conveyor roller 60 and is operatively engaged by a spur gear 62 mounted on the shaft of said conveyor roller 60. Spur gear 62 meshes with spur gear 64 driven by conveyor drive chain 66 which, in turn, is driven by a first drive sprocket 68 mounted on axle 70 of ground engaging wheels 14 to rotate therewith.

At the rear of frame 12, the mentioned uprights 72 also provide support for conveyor roller 60 and spur gear 64 with which spur gear 62 meshes to effect movement of the conveyor 54. Uprights 72 also serve as a stop against which a bin or crate CR may be located on platform 74. Platform 74 is shown hingedly connected intermediate its ends as at 76 to the rear ends of the longitudinal frame members 15, 16, to facilitate the loading and unloading of the bins or crates. Suitable locking means, not shown, may be utilized to hold the platform in place during the harvesting operation. Preferably a chute 78 is located beneath the upper end of the conveyor belt 56 to catch the harvested asparagus spears as they fall off the top of the conveyor belt and direct them downwardly into the provided bin or crate.

An important feature of the invention is the novel means provided which move the snapping bars 28 downwardly in a controlled pattern ahead of the leading edge 30 of the apron to divide the asparagus into isolated clumps across the width of the snapping bars and abutments, gather the thus isolated clump of asparagus spears and sever the individual spears from their stubble as the lower edge of the snapping bar is brought rearwardly over and beyond said leading edge 30 of the apron 24.

Figure 2:
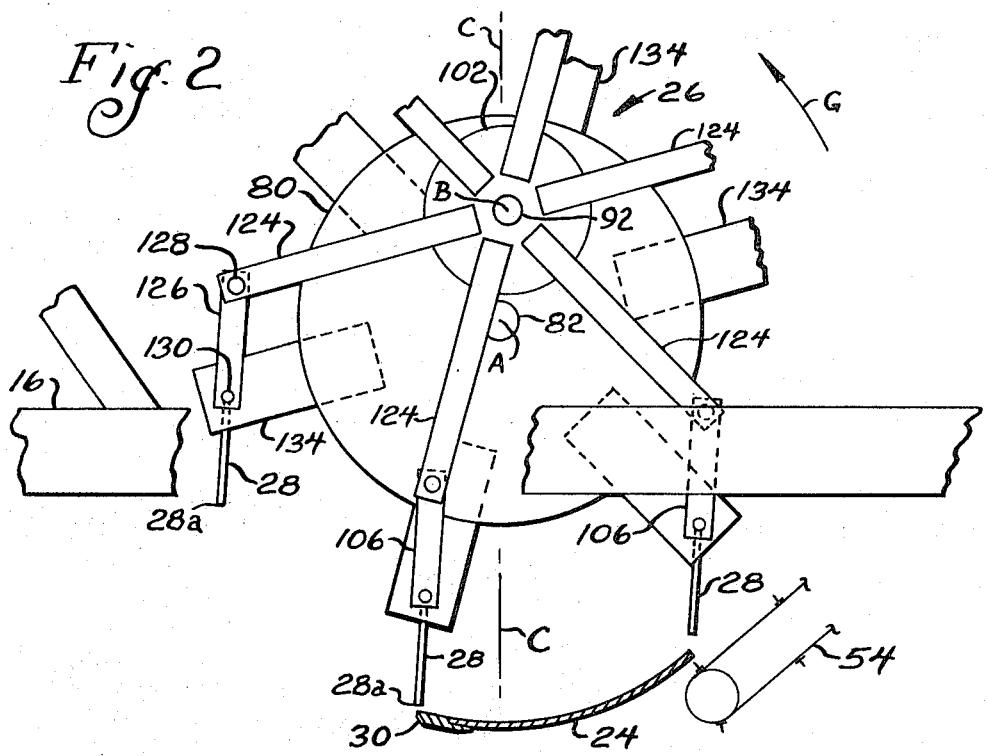
FIG. 2 is an enlarged side elevational view, also somewhat schematic, of the reel assembly of snapping bars utilized in the embodiment of the invention illustrated in FIG. 1.

Referring now particularly to FIGS. 2 and 3, said means includes the aforementioned reel 26 which, as shown, comprises a pair of spaced discs 80 affixed as by welding about the opposite ends of reel drive shaft 82. In FIG. 3 reel drive shaft 82 is shown rotatably supported at one end in a suitable opening 83 of a first journal bracket 84 which is itself secured in upright position to longitudinal frame member 15. The opposite end of reel drive shaft 82 has a cylindrical opening 86 in which is rotatably received stub shaft 88. Stub shaft 88 is fixedly secured to a vertical arm 90 which depends from stub shaft 92; shaft 92 being located within opening 94 thereof and rigidly fixed as by welding. The opposite or outer end of stub shaft 92 is similarly secured within opening 96 of a member 98 welded or otherwise fixedly secured to longitudinal frame member 16. Stub shaft 88, via arm 90, stub shaft 92 and upright 100 thus cooperates with upright 84 to provide rotatable support for reel 26; opening 83 and stub shaft 88 defining a first horizontal axis A-A about which the reel 26 rotates with forward movement of the apparatus on its ground engaging wheels 14. Rotation of reel 26 obtains through a second drive sprocket 110 mounted on wheel axle 70 to rotate therewith. Said second drive sprocket 110 drives an intermediate sprocket 112 through drive chain 114. Sprocket 112 is affixed to an intermediate jack shaft 116 suitably mounted between frame members 15, 16 to which is also rigidly mounted a larger second intermediate sprocket 118. Rotation of sprocket 112 therefor rotates sprocket 118 which in turn drives sprocket 120 fixed to the end of reel shaft 82 through drive chain 122. The thus described drive effectively rotates the reel and its supported snapping bars 28 in response to forward movement of the apparatus and at a speed several times the ground speed at which the apparatus is pulled by the tractor during the harvesting act. As illustrated in FIGS. 2 and 3, the snapping bars 28 are pivotally supported between the outer ends of equispaced radial extension arms 134 fixed to said discs 80.

In accordance with the invention, means are also provided which function both to maintain the snapping bars 28 at a constant vertical disposition as they are rotated downwardly ahead of the apron and then across the leading edge 30 thereof and also to control the downward slope of the path which the lower edge 28a of the snapping bars 28 follows during rotation of the reel 26. Such means are best illustrated in FIG. 2 as comprising associated linkage pivotally connected between each of the snapping bars 28 and a spider disc 102 which is freely rotatably mounted on stub shaft 92 (FIG. 3). As illustrated in FIG. 2, said stub shaft 92 defines a second horizontal axis B-B which is spaced above first horizontal axis A-A and slightly to the right or rearward of a vertical plane C-C which includes the first horizontal axis A-A on which reel 26 rotates and about which the snapping bars 28 therefor also revolve. Fixed to spider wheel 102 are equidistantly spaced radial link arms 124 corresponding in number to the number of snapping blades 28. At their outer extremities, radial link arms 124 are pivotally connected to link arms 126 as by pivot pins 128. The opposite ends of link arms 126 in turn are each rigidly secured to a pivot pin 130 which passes through a rubber grommet 132 provided in the end of a respective one of the mentioned radial extension arms 134 of reel 26 and rigidly secured to the upper edge 28b of a respective snapping bar 28. Links 124 and 126 thus constitute two adjacent arms of a four bar mechanism or parallelogram of which the spacing between horizontal axes A and B and the spacing between axis A and pivot pin 130 provide the other two arms. As illustrated in FIG. 2, pivot pins 128, 130 lie in a plane disposed intermediate the opposed parallel planar surfaces of the snapping bar 28 to which link arm 126 is rigidly fixed and are spaced apart a distance corresponding to the opposite link arm of the four bar mechanism effectively defined between horizontal axes A and B on which the reel 26 and spider disc 102 rotate. The distance between pivot pin 128 and horizontal axis B is longer than the distance which separates axes A and B and is equal to the spacing of pivot pin 130 from horizontal axis A. It will therefore be appreciated that as reel 26 is rotated with forward movement of the apparatus 10, the positions of pivot points of the parallelogram defined by axis A and B being fixed, each of the snapping bars 28 will be caused to maintain a constant and unchanging parallel disposition to each other and a plane comprising axes parallel disposition to each other and a plane comprising axes A and B as reel 26 rotates on shaft 82. As previously indicated, horizontal axis B is intentionally located a short distance behind vertical plane C-C containing horizontal Axis A, wherefore snapping bar 28 will be similarly disposed at a small angle to vertical. However, as illustrated in FIG. 2, with rotation of the reel 26, the radial spacing of the lower edge 28a of the snapping bars 28 from the reel rotational axis A does change under the influence of the parallelogram or four bar mechanism thus described and so that the lower edge 28a of each snapping bar traces a path as defined by E in FIG. 4.

Now referring to said FIG. 4, m represents the position along path E of lower edge 28a of each snapping blade 28 as it is located immediately over the leading edge 30 of the apron 24, and n represents the position of the lower edge 28a of the same snapping bar 28 after the reel has rotated through 360° to again locate the lower edge of the same snapping bar at the leading edge of the apron. Thus, the distance M and N represents the forward progress of the apparatus 10 and the leading edge 30 of its apron 24 in one complete rotation of reel 26. E' represents a portion of the path that the lower edge 28a of the next succeeding snapping bar 28 follows. Thus, for example, where reel 26 supports six equidistantly spaced snapping bars 28 the lower edge 28a of each snapping bar trails the lower edge of the preceding snapping bar by an indicated angle of 60°; and in FIG. 4 the lower edge 28a of the succeeding snapping bar is illustrated as at m' when the lower edge 28a of the preceding snapping bar is at m. As previously mentioned, the apparatus 10 and thereby leading edge 30 of its apron 24 is moving in a forward direction indicated by arrow F at a fraction of the peripheral speed of the lower edge 28a of the snapping bars which are revolving in a counter-clockwise direction as indicated by the arrow G in FIG. 2. Also due to the influence of the parallelogram linkage above described, the radial spacing of said lower edge 28a from horizontal axis A is gradually changing. The result is that the lower edge 28a defines an arc E the center of which moves forwardly with the vehicle but always in plane D-D parallel to ground G. By appropriate selection of apparatus ground speed, rotational speed of the reel and dimensions for the links of the parallelogram, the downward descent of the snapping bars 28 ahead of the abutment comprising the lead edge 30 of the apron may be made very steep and nearly vertical between plane D-D and m as indicated in FIG. 4. The downward movement of the snapping bars 28, however, does not trace a true vertical path and the rapid leveling off of path E as the lower edge 28a of the snapping bars approach point m where the snapping of the asparagus spears is utilized to induce a clean sharp break of the spears from the stubble as the snapping bar 28 moves over the leading edge 30 of the apron.

As illustrated in FIG. 4, initially as the snapping bar passes beyond axis A-A in its downward path, it rapidly decelerates in speed until it reaches a point $x$ designated its point of zero velocity in relation to the ground speed of the apparatus 10 at which time it reverses its forward movement and approaches the abutment or apron lead edge 30. The forward movement of the lowering snapping bar 28 ahead of zero velocity point $x$ and its deceleration is utilized advantageously to wedge the lower edge 28a of the snapping bar which leads its upper edge 28b into the asparagus bed to isolate a clump of asparagus. As the snapping bar lower edge 28a moves below point $x$, it again accelerates to gather the isolated clump of asparagus spears and cleanly snap them across the approaching abutment 30.

It will be appreciated that as the snapping bar approaches the abutment 30 the upper portion 28b of the contacting surface of the snapping bar will be bending the adjacent spears of the clump toward the abutment before its lower edge 28a reaches the abutment and these spears will also be snapped. Therefore, in the interval between $m'$ and $m''$ (corresponding to $m$, the lead edge 30 of the apron having moved forwardly by distance $y$), said lead edge will be sweeping across the stubble of asparagus already severed at $m$. The extent of stubble over which the lead edge 30 of the apron sweeps is indicated at $z$.

Ideally, the zero velocity point of the travel of the lower edge 28a of the snapping bars represented at $x$ will be forward of the leading edge 30 of the apron by an amount equal to one-half the distance of the ground travel between snapping bars and $z$ would therefore be half way between $m''$ and $m$ or of the distance indicated by $y$. However, in our experimental work we have found that where the ground travel distance over which the snapping bars bend the asparagus spears does not substantially exceed 3 inches, damage to the asparagus spears is inconsequential, depending on the speed of harvesting, the ratio of bar peripheral speed to the forward speed of the apparatus and the angle at which the snapping bar is inclined rearwardly of vertical. Although the snapping bars 28 may be maintained exactly vertical by locating horizontal axis B-B in vertical plane C-C containing horizontal axis A-A about which the reel rotates, it has been found advantageous to incline the snapping bar at a small angle, ordinarily less than 5°. The upper edge 28b of the snapping bar therefore trails the lower edge 28a of the snapping bar as it first enters the uncut asparagus bed with the forward progress of the apparatus and therefore assists in isolating the selected clump from the remainder of the bed. By reason of its inclination, the upper edge 28b of the snapping bar is already engaging the top of the spears of the clump as its lower edge 28b subsequently passes over abutment 30 wherefore in the snapping action there is less chance of double breaking of the spears.

In FIG. 4, B'-B' represents the horizontal path which horizontal axis B maintains as the apparatus is drawn across the bed of asparagus. A'-A' represents the horizontal path which the reel acts as A-A maintains; and D-D represents the path which the centers of the described path E of the lower edge 28a of the snapping bars describes with rotation of the reel 26.

Cognizant of the fact that when ready for harvesting the height of asparagus growing in the field will average below 15 inches and that the asparagus is ideally cut at a stubble height of 3 inches from the ground, a prototype of the apparatus was constructed having a reel radius of 10½ inches and with six 6 inch high snapping bars, i.e., with a 60° spacing between bars. The lower edge 28a of said bars was disposed about three-eighths inch ahead of its upper edge 28b providing an inclination of about 3°. Considering an adequate harvesting speed to be about 4 miles per hour, or 70.4 inches ground speed per second, it was found that when the drive for the reel was related to rotate the snapping bar lower edge 28a at a peripheral speed of 163 inches per second, the ground travel distance between snapping bars would be 4¾ inches and point $z$ about 2 inches ahead of point $m$. Therefore, in the prototype the leading edge of the apron was sweeping over 2 inches of stubble and 2¾ inches of asparagus spears were being bent between the abutment and the oncoming snapping bar. The bending of 2¾ inches of asparagus spears was found not to be excessive. The asparagus spears were cleanly snapped at a uniform stubble height and there was little evidence of flailing or other damage to the harvested spears. Similar good results were obtained in a second embodiment where four snapping bars were arranged at 90° intervals about a reel of 6 inch radius. In this embodiment the forward speed of the apparatus was also 70.4 inches per second and the peripheral speed of the snapping bars at their lower edges 220 inches per second. The ground travel between snapping bars was 3 inches.

As indicated in FIG. 4, apron 24 is curved on an arc concentric with the center $d'$ on which the lower edge 28a of the snapping bars revolve. The rearward extent of the apron should be equal to several times the angular spacing of the snapping bars as illustrated at $s$ at the left hand side of FIG. 4; and a gap left between the path of the lower edge of the snapping bars and the upper surface of the apron 24 should be at least one-eighth inch and less than the thickness of the asparagus spears being harvested, but not greater than three-fourths of an inch to be effective in the snapping action. It is also advantageous that the leading edge 30 of the apron precede vertical plane C-C by a distance equal to the ground travel between snapping bars which in one of the above-described prototypes is 4¾ inches and in the other 3 inches. This lead of the abutment 30 ahead of the low point of the course E which snapping bars 28 follow serves several important functions. First it turns the leading edge 30 of the apron in an upward direction away from ground level so that it is less apt to collect dirt and trash. Said edge 30 is also directed away from new growth and the apron tends to brush thereover with minimum damage to the immature spears. It also rotates the angular opening between snapping bars forwardly and upwardly so that a maximum size opening is available between between the bars for the asparagus spears to enter and be set up for the snapping process. The forward positioning of the leading edge or abutment 30 also limits the downward sweep of the snapping bars. Also, the initial movement of the snapping bars downwardly across the upward surface of the apron can be utilized to develop sufficient rearward moving inertia to carry the spears across the pan or apron 24 to the conveyor.

From the above description of the specific embodiment of the invention it will be apparent that all of the recited objects and features of the invention have been demonstrated as obtainable in a highly practical construction that is also effective in its operation.

Having described our invention, we claim:

1. Apparatus for harvesting field growing asparagus and the like comprising, a frame or vehicle adapted to be moved in a forward direction, a horizontally disposed abutment supported by said frame at a level at which the asparagus is to be harvested, reel means mounted on said frame to rotate about a first horizontal axis disposed above said abutment, at least one snapping bar mounted on said reel means to swing about a second horizontal axis radially spaced from and parallel to said first horizontal axis and to be carried with rotation of said reel means about said first horizontal axis downwardly ahead of an asparagus clump approached by said frame and across said abutment to snap the asparagus therebetween, and means holding said reel-mounted snapping bar in a constant vertical disposition as it moves downwardly and across said abutment.

2. Apparatus as claimed in claim 1, comprising a plurality of snapping bars equidistantly spaced about the periphery of the reel means.

3. Apparatus as claimed in claim 2 wherein said frame supports means for collecting the snapped asparagus stalks as they are moved by said reel-mounted bar past said abutment.

4. Apparatus as claimed in claim 2 wherein the abutment is spaced forwardly of a vertical containing the horizontal axis on which the reel means rotates.

5. Apparatus as claimed in claim 1 wherein the means holding the snapping bar in a constant vertical disposition comprises a four bar mechanism of which two adjacent pivot points are fixed to the vehicle and the other two pivot points are fixed to the snapping bar.

6. Apparatus as claimed in claim 1 wherein one of the two pivot points fixed to the vehicle comprises the axis on which the reel rotates.

7. Apparatus as claimed in claim 6 wherein the four bar mechanism is a parallelogram.

8. Apparatus as claimed in claim 7 wherein the second fixed pivot point on the vehicle is located above the first fixed pivot point and behind a vertical plane which contains the first fixed pivot point.

9. Apparatus as claimed in claim 8 wherein the two fixed pivot points on the snap bar are spaced from the lower edge thereof.

10. Apparatus as claimed in claim 9 wherein the two fixed pivot points of the parallelogram on the snapping bar lie in a plane including the asparagus engaging surface of the bar.

11. Apparatus as claimed in claim 1 wherein the asparagus engaging surface of the snapping bar defines a plane inclined at a small angle off vertical.

12. Apparatus as claimed in claim 1 wherein the horizontally disposed abutment comprises the leading edge of an apron having a cupped shape concentric with the center about which the lower edge of the snapping bar rotates.

13. Apparatus as claimed in claim 1 wherein the snapping bar in its downward path ahead of the abutment initially moves at a decelerating rate in a forward direction as it enters the asparagus and then reverses its direction to gather the asparagus and carry it across the abutment to effect snapping the same from its stubble which remains.

14. Apparatus as claimed in claim 13 comprising a plurality of equi-spaced snapping bars about the reel and wherein the point at which each snapping bar reverses direction is about midway between the angular spacing of the snapping bars.

15. Apparatus as claimed in claim 12 wherein the leading edge of the apron is disposed above the lowermost point in the travel of the snapping bar thereacross.

16. In apparatus for harvesting asparagus and the like comprising a vehicle movable across a field of growing asparagus to be harvested, the combination of an abutment member carried by said vehicle which extends transversely of and faces the direction in which the vehicle moves, a drive member mounted on the vehicle for rotation on a first pivot axis disposed above and in a plane spaced behind and generally parallel to said transverse abutment member, at least one snapping bar pivotally connected to said drive member to turn on a second axis spaced from and parallel to said first pivot axis, said snapping bar being disposed generally parallel to the abutment member and being carried downwardly with rotation of said drive member forwardly of and then across the abutment member to sever asparagus engaged by the abutment member, and linkage means pivotally connected to swing on a third pivot axis fixed to the vehicle and spaced above and parallel to said first pivot axis, said linkage means being pivotally connected to the snapping bar to swing on a fourth pivot axis spaced from said second and third pivot axis and parallel thereto, said fourth and second pivot axes being separated by a distance equal to the spacing of the first and third pivot axes, and the third and fourth pivot axes being separated by a distance equal to the spacing between the first and second pivot axes such that the snapping bar maintains a constant vertical disposition as it rotates with the drive member about said first pivot axis.

17. The process of harvesting asparagus and other stalk type vegetables comprising the steps of moving a horizontally disposed abutment across a field of growing asparagus at the harvesting height, simultaneously rotating a series of equispaced bars downwardly ahead of the abutment in a forward direction and at a effectively decelerating ground travel speed to isolate a clump of asparagus, then reversing the direction of the bars and accelerating the related ground speed to gather the spears of the isolated asparagus clump between the approaching abutment and bar, and passing the bar over the abutment to separate the gathered spears from the stubble which remains.

18. The process of claim 17 wherein the upper edge of the bars trail their lower edge in their downward forward progress and precede the lower edge in passing over the abutment.

* * * * *